Sept. 11, 1934.  R. E. GILLMOR  1,972,882
GYROSCOPIC COMPASS
Filed Nov. 6, 1930   5 Sheets-Sheet 1

INVENTOR
Reginald E. Gillmor.
BY
Herbert H. Thompson
his ATTORNEY.

Sept. 11, 1934.   R. E. GILLMOR   1,972,882
GYROSCOPIC COMPASS
Filed Nov. 6, 1930   5 Sheets-Sheet 2

INVENTOR
Reginald E Gillmor
BY Herbert H. Thompson
his ATTORNEY.

Sept. 11, 1934.   R. E. GILLMOR   1,972,882
GYROSCOPIC COMPASS
Filed Nov. 6, 1930    5 Sheets-Sheet 3

INVENTOR
Reginald E. Gillmor.
BY
Herbert H. Thompson
his ATTORNEY.

Sept. 11, 1934.                R. E. GILLMOR                 1,972,882
                             GYROSCOPIC COMPASS
Filed Nov. 6, 1930                                  5 Sheets-Sheet 4

INVENTOR
Reginald E. Gillmor.
BY Herbert H. Thompson
his ATTORNEY.

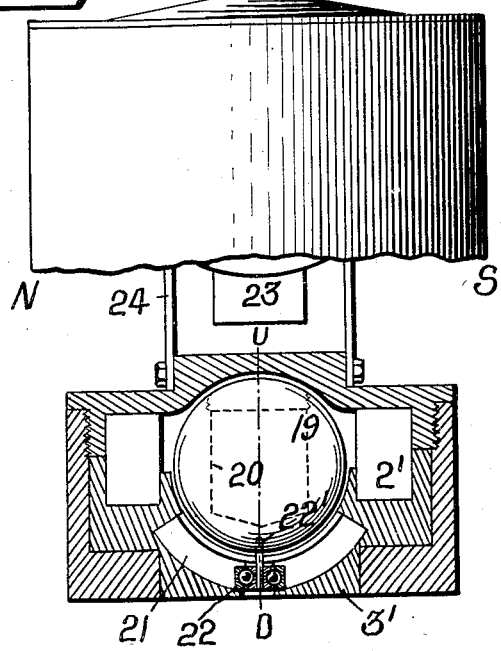

Patented Sept. 11, 1934

1,972,882

UNITED STATES PATENT OFFICE 1,972,882

GYROSCOPIC COMPASS

Reginald E. Gillmor, New York, N. Y.

Application November 6, 1930, Serial No. 493,729

14 Claims. (Cl. 33—226)

In my prior application No. 321,587 filed November 24, 1928 for Gyroscopes and gyroscopic compasses, I have shown and described a gyro compass comprising a rotating ball supported on a film of air and containing within the ball means for imparting meridian seeking and damping characteristics. The supporting film of air is preferably provided by the rotation of the ball itself, although this may be supplemented by air from an external source in starting up and also afterwards, if desired. Although the compass described in the aforementioned application should cost less to manufacture and at the same time give more accurate and reliable performance than any existing type of gyro compass, a still simpler design and better performance should be obtained if means could be found for eliminating the internal ballistic and damping system, thus permitting the use of a solid ball. I use the term "solid" in contradistinction to a ball having a fluid center. I may use, however, a ball which is hollow or which is made in annular form and I may construct the ball of a plurality of parts. The annular construction has the advantage of eliminating the weight at the center of the ball which has very little gyroscopic value but which has the disadvantage of loading the supporting air film.

Referring to the drawings in which several preferred forms of the inventions are shown:—

Fig. 22 is a variable section of a preferred form of stabilizing means for use on my compass.

Fig. 23 shows the usual form of stabilizing as it would be employed for my compass.

Fig. 24 shows a modified means for stabilizing the follow-up system from the equatorial air stream of the ball.

Fig. 25 shows still a further modification in which means are employed to maintain the settling point of the compass on the true meridian.

Figure 1:
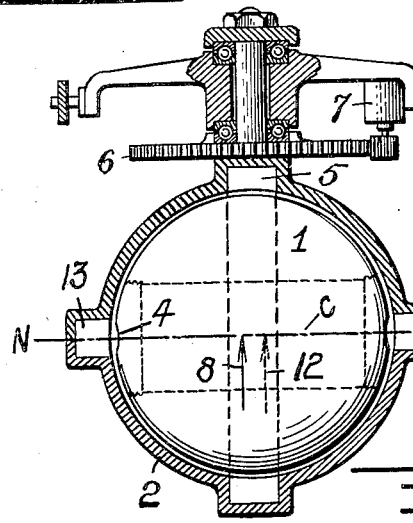
Fig. 1 is a vertical section in diagrammatic form of my gyro compass.

One form of my solid ball compass is shown in its most elementary form in Fig. 1. This compass utilizes a rotating sphere 1 which supports itself on an air film created by its own rotation in the cup 2. The ball is driven, is made meridian seeking and its oscillations are damped, all by means of interactions between stator 5 and ball 1, thus avoiding the use of any ballistic or damping devices as a part of the gyroscopic element. The compass card and azimuth gear 6 are made to follow the axis of the ball by means of an azimuth motor 7 which is operated preferably by a thermionic valve amplifier system controlled by the relation between the cup-like depressions 4 and the inductances 13, 14. Thus, I have obtained a gyroscopic system which is supported, driven, made meridian seeking and followed in azimuth, all without mechanically touching the gyroscopic system in any way.

I consider that one of the most important features of the ball compass is the self-created air film for supporting the gyroscopic element. I have found by experiment that when the supporting air is provided from an external source, it is very difficult to prevent the ball from touching the sides of the cup in which it rotates when the ball or its surrounding structure is subjected to shocks or acceleration pressures. When the ball creates its own supporting air film, however, this film becomes exceedingly thin and tough and will resist all shocks and accelerations. In fact, I have observed that the compass may be subjected to shocks so severe as to knock the ball ¼ of an inch out of the cup without disturbing the position of the ball's axis. It has been proven that with suitable forms of cup, described in my previous application, the rapid rotation of the ball will always create a supporting air film, thus preventing the ball from touching the sides of the cup under any condition of acceleration or shock which may be experienced in service.

Figure 2:
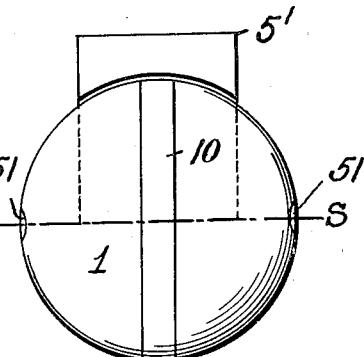
Fig. 2 is a diagram showing a modified form of ball and stator.
Figure 3:
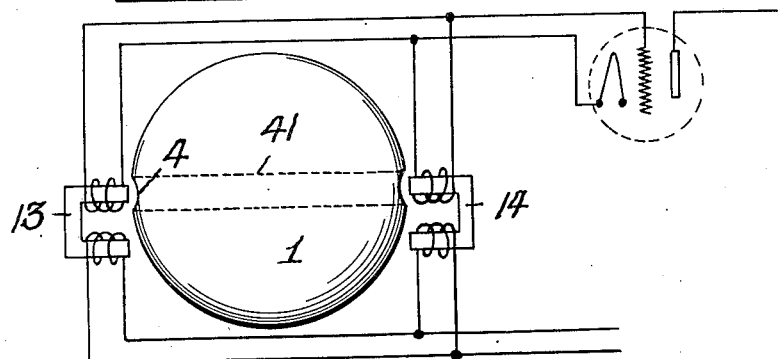
Fig. 3 is a wiring diagram showing in simplified form how the follow-up motor is driven from the ball.

Fig. 1 is a form of construction similar to that described in my aforesaid previous application except that a solid ball 1 is employed instead of a ball with an axial chamber containing fluids, floats, etc. The ball may be made of iron or steel or it may be of non-magnetic material such as brass with a laminated or solid steel equatorial ring 10 (Fig. 2) to serve as the rotor of an induction motor. The equatorial ring may be secured between two halves of the sphere or may be cast integral with the sphere by any one of several well known methods. In all cases the ball must have on its equator or at its ends some means for producing changes in the magnetic path between the pole pieces 13, 14 of the follow-up control which is carried on the follow-up system 3 as described in my previous application. The means for causing variations in magnetic flux between pole pieces of the follow-up control, which lie in the axis of rotation of the ball, may be a cup-like depression as shown at 4 in Fig. 1 or a steel button 51 as shown in Fig. 2, or may be an axial hole 41 through the ball (Fig. 3). In the first case, movements of the ball around the vertical axis would move the cup-like depressions in such manner as to increase the magnetic material in the magnetic circuit of one of the transformers 13 or 14 (Fig. 3) and decrease that in the other, thus unbalancing the secondary potentials of these transformers and thereby impressing a potential on the grid of the first tube of the amplifier in such manner as to cause the follow-up system to move around the vertical to again place the transformers in balanced condition. The axial hole through the ball would have the same effect as the cup-like depressions. In case the ball is of brass or other non-magnetic material, the steel buttons 51 on the axis of the ball may be used with like effect.

A follow-up system controlled by variable inductances and thermionic valves has been described in my prior application No. 321,587 filed November 24, 1928. The circuits disclosed in that application would be equally applicable to my solid ball compass. In fact, I may use any type of follow-up control in which variation of the control inductances or transformers is obtained without employing current carrying parts on the gyroscopic element.

Figure 4:
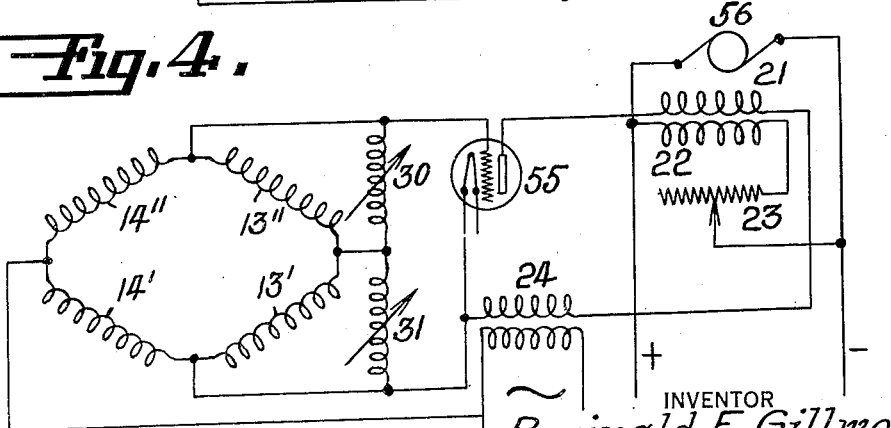
Fig. 4 is a wiring diagram showing how the form of the invention in Fig. 11 is used to actuate the follow-up motor.

Figs. 3 and 4 show a motor circuit which differs from that in my prior application and has the advantage of simplicity. In Fig. 4 a direct current motor 56 is employed. The motor is provided with opposing fields 21 and 22. The armature of the motor is continuously energized from a source of direct current supply. Field 22 is also energized by direct current but the value of the current in this field is made adjustable by the rheostat 23. Field 21 is energized by pulsating direct current in the plate circuit of the thermionic valve 55. This pulsating direct current is derived from the secondary of the transformer 24, the primary of which is supplied with alternating current. When the control inductances or transformers on the compass are balanced, field 22 is adjusted so that it exactly equals and opposes field 21 and the motor stands at rest. When any relative movement takes place between gyroscopic member and the surrounding members, the grid potential in valve 55 is shifted up or down, the fields of the motor become unbalanced and the motor rotates until balance has again been restored—i. e., until the follow-up system is again brought into coincidence with the gyroscopic member.

To cause the ball always to rotate around the same axis, it is only necessary to construct it so that it will have a maximum moment of inertia around that axis. This may be done by an axial chamber C through the ball (Fig. 1).

Figure 5:
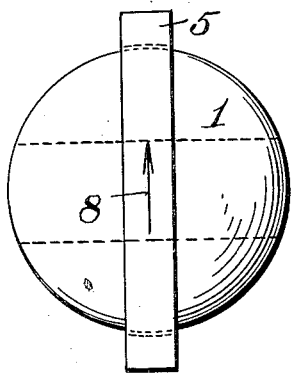
Fig. 5 is a diagram illustrating the forces exerted on the ball by the stator.
Figure 6:
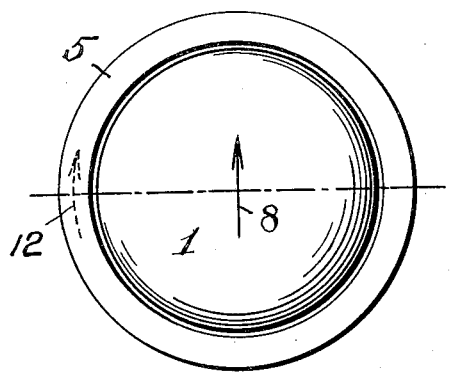
Fig. 6 is a similar diagram showing the forces when the stator has been displaced 90° from the position shown in Fig. 2.

It has been found from experience that once the ball is given a rotation about any axis fixed in the ball, as for example the axis of maximum inertia N—S in Fig. 1, it will continue to rotate about that axis even though the axis of the rotating means is displaced. If the axis of the rotating means is displaced from the axis of the rotating ball, then this displacement causes the rotating means to exert components on the ball which will cause the ball to precess and bring its own axis of spin into coincidence with the axis of the rotating means by the shortest path. For example, supposing the ball in Fig. 5 is rotating with its axis N—S in coincidence with the axis of the stator, and supposing the axis of the stator is then displaced 90-degrees as in Fig. 6, the stator will then exert a torque as shown by arrow 12 around an axis transverse to the axis of rotation N—S and the effect of this torque will be to precess the axis of the ball into the axis of the stator by the shortest path.

For the sake of simplicity in explaining meridian seeking and damping action, I have in Figs. 5, 6, 7 and 8 dispensed with the spider and have shown only the ball and stator. The stator may be completely circular as shown or may be semicircular. The direction of rotation of the ball is in all cases indicated by a solid arrow 8 and the direction of the torque of the stator is indicated by a dotted arrow 12.

Figure 7:
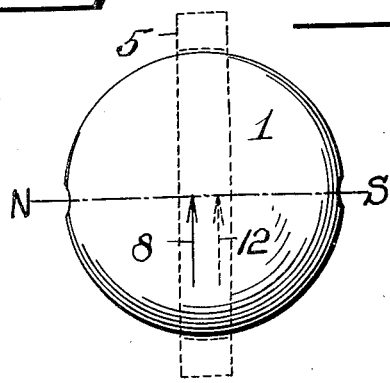
Figs. 7 and 8 are similar diagrams showing the effect of the rotation of the earth on the ball.
Figure 8:
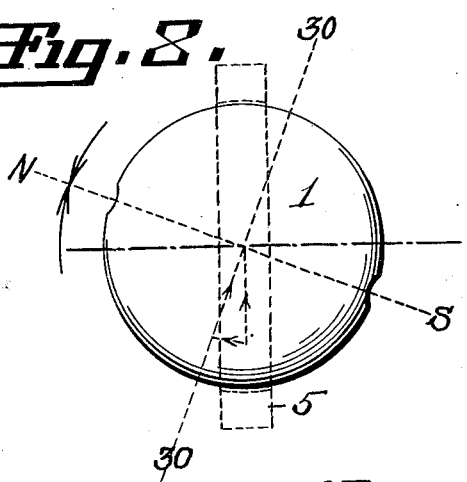
Figure 9:
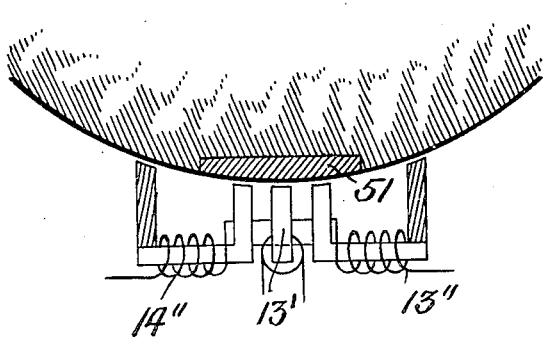
Fig. 9 shows a section through one pair of inductances of Fig. 11.

In Fig. 7 I have the initial condition of stator torque and ball rotation in the same direction and in the same plane. Assume in this figure that the N end of the ball is pointing east. The rotation of the earth will then cause the N end of the axis of the ball to rise and we will have a condition as illustrated in Fig. 8. This elevation of the axis will continue until a point is reached where the stator component around the axis 30—30 is such as to cause a rate of precession of the ball around the horizontal axis exactly equal to the effect of the horizontal component of the earth's rotation. The effect of the horizontal component of the earth's rotation in tilting the rotational axis of the ball varies with the angular distance of that axis from the meridian. For instance, at the Equator, with axis pointing east and west, the effect would be a maximum, with axis pointing north and south, the effect would be nil. Therefore, the spinning axis of the ball will assume an elevation from the horizontal always proportional to the angular distance between the axis of the ball and the meridian. If I can cause this elevation of the axis to produce a displacement of the stator toward the meridian and can make this displacement proportional to the elevation, I will be able to make the ball meridian seeking. This because, as explained in connection with Figs. 5 and 6, the axis of the ball will always follow the axis of the stator by the most direct path.

Figure 10:
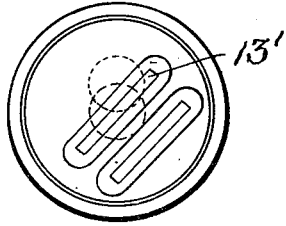
Fig. 10 is a view showing inclined pole pieces on the stator for securing meridian seeking action.
Figure 11:
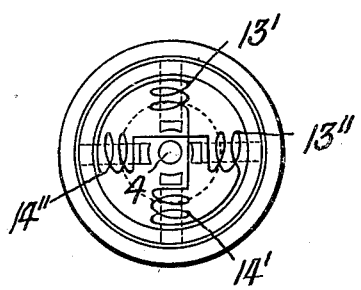
Fig. 11 shows a method of controlling the follow-up motor for relative movements in elevation as well as azimuth.
Figure 12:
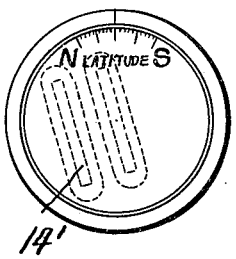
Fig. 12 is a view showing how the mounting for the pole pieces of Fig. 10 may be graduated for latitude.

A convenient means for accomplishing this is available in the follow-up system. Consider the effect of inclining the pole pieces 13 and 14 of the follow-up inductances as indicated in Fig. 10. Any elevation of the ball's axis will unbalance these inductances in the same way as they would be unbalanced by an azimuthal movement. The zero or null point of the follow-up inductances will thereby be displaced in azimuth and I can make that displacement bear any desired relation to the tilt, simply by inclining the pole pieces of the follow-up inductances more or less. Another means for accomplishing this same effect would be to provide four inductances in the follow-up control, two in a vertical plane 13′ and 14′, (Fig. 11) and two in a horizontal plane 13″ and 14″, and connect them electrically in the form of a Wheatstone bridge as in Fig. 4. Thus any tilt in the ball will unbalance the bridge and make necessary an azimuthal displacement of the follow-up system in order to again bring about a condition of equilibrium in the follow-up circuits. In the case of the first method—i. e., slanted pole pieces—the period of meridian seeking oscillation of the ball may be governed by the amount of inclination that is imparted to the pole pieces. The inclination of the inductances may therefore be calibrated for latitude as indicated in Fig. 12. In the case of the Wheatstone bridge method, the period may be altered by electrically changing the relations between the values of the vertical inductance coils and the horizontal inductance coils. This may be accomplished by the variable inductances indicated by the conventional symbols 30, 31 in Fig. 4. These inductances may be mounted on the control panel external to the compass.

Figure 13:
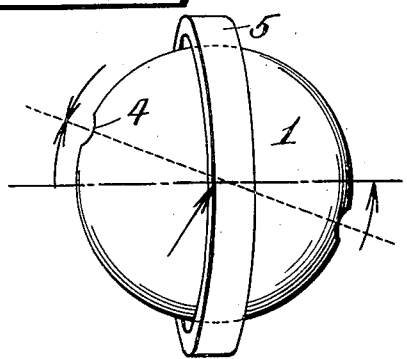
Fig. 13 is a diagram illustrating the effect of displacing the stator in azimuth toward the meridian proportionally to inclination of the axis of the ball.
Figure 14:
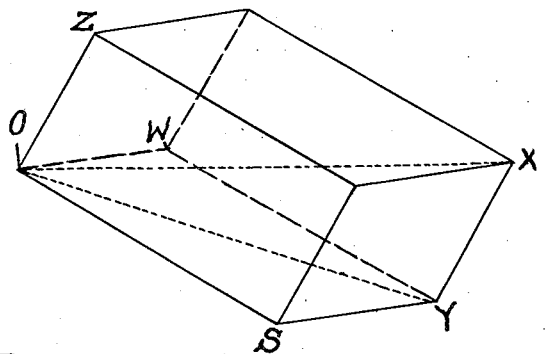
Fig. 14 is a vector diagram of the forces acting on the ball in Fig. 13.

Consider now the effect of displacing the stator in azimuth proportionally to the tilt of the ball's axis. This is illustrated in Fig. 13. The components of the stator couple may be shown in a vector diagram such as Fig. 14. This may be regarded as a perspective view of a transparent rectangular solid, of which the edge OS represents the inclined axis of rotation of the ball; OW a horizontal axis perpendicular to OS; and OZ a third axis perpendicular to OS and OW. The horizontal vector OX represents the axis of the stator couple which has been displaced from the azimuth of the ball spin axis through the horizontal angle SOY.

If the vector OX represents the actual stator couple, this may be resolved into components, OS round the spin axis of the ball maintaining the rotation, OZ round the quasi-vertical axis of the ball causing precession round OW and reducing the inclination of its spin axis, OW round the horizontal transverse axis of the ball, causing precession round OZ making the ball follow the stator.

As the axis of the ball approaches the meridian, the horizontal component of the earth's rotation will have less and less effect. Therefore, the tilt of the axis will become smaller and the displacement of the stator toward the meridian will become less until finally the axis of the ball will come to rest with a fixed relation to the north and south meridian which relation will be dependent upon the speed, course and latitude of the ship on which the compass is mounted.

Figure 15:
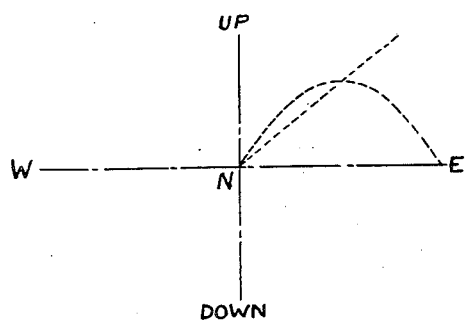
Fig. 15 is a polar diagram showing the aperiodic settling of the ball of Fig. 13.
Figure 16:
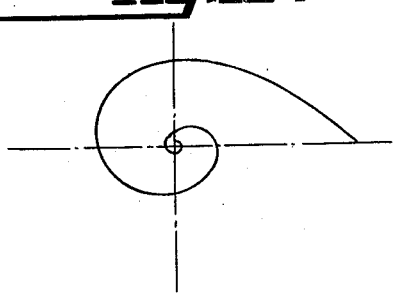
Fig. 16 shows the periodic settling curve for the form of compass shown in Fig. 2.

If the ball is made of solid magnetic material (in which case either an axial chamber or cuplike depressions will be used to control the follow-up system), the stator would be able to act equally well about any axis and the oscillation of the ball toward the meridian would be aperiodic as indicated by the polar diagram in Fig. 15. If, however, a wide stator with spherical face is used and the ball is made of brass with a laminated iron or steel rotor cast integral with it as indicated in Fig. 2, then the stator would act efficiently only about the axis of rotation. It would produce very small torques about the other axes. By this form of construction therefore I obtain a periodic action of the ball when seeking the meridian as indicated in Fig. 16.

Figure 17:
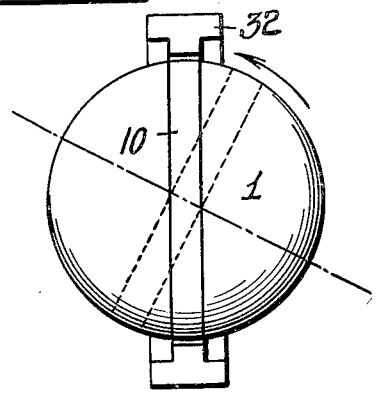
Fig. 17 shows still another form of stator drive by which meridian seeking action is secured by direct magnetic pull.

Another and preferred method of imparting meridian seeking and damping characteristics to the solid ball is afforded by what may be called electro-magnetic constraint between stator and rotor. If a narrow rotor 10 and stator 32 are employed as indicated in Fig. 17, the stator will exert a strong electro-magnetic pull, tending to resist any departure of the rotor from the plane of the stator. The effect of this electro-magnetic pull is very different from the effect of the transverse components of the driving torque of the stator. For example, if in Fig. 17 the axis of the ball should tilt, thus bringing the rotor to the position shown by the dotted lines, the stator will exert a pull around the transverse horizontal axis which would result in precessing the ball around the vertical axis. The consequent displacement of the ball around the vertical axis would immediately cause a magnetic torque around that axis which would result in precessing the ball around the transverse horizontal axis. The axis of the ball will therefore follow a spiral path and will eventually return again to the axis of the stator. This action is quite different from the action of the components of the stator driving torque as described in connection with Figures 7 and 8. To distinguish between them, I will refer to torques illustrated in Figures 7 and 8 as driving torque components and to the phenomena illustrated in Fig. 17 as magnetic torque.

Figure 18:
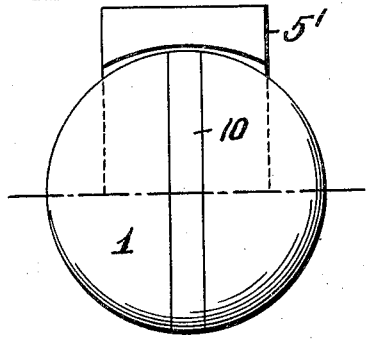
Figs. 18 and 19 show a modified form of Fig. 17 in which damping is also secured by the direct action of the specially shaped stator.

I can control the value of the magnetic torque within wide limits. For example, if I use a wide stator 5′, the face of which is perfectly concentric with the ball, as in Fig. 2, and a narrow rotor 10 cast as an equator in a brass or bakelite or glass ball, I will then have no appreciable magnetic torque. The other extreme is the condition shown in Fig. 17 previously referred to. In this case the magnetic torque tending to pull the rotor into the plane of the stator is a maximum. I can obtain any mean that I wish between these two extremes by variation in the rate of change of air gap which occurs when the axis of the ball is deflected from the axis of the stator. For example, in Fig. 18, an arrangement is shown wherein deflection between the axis of stator and ball produces a very gradual increase in the air gap between rotor and stator. With this arrangement the stator will always exert a pull on the rotor tending to establish a position of shortest air gap between stator and rotor, and the value of this pull can be changed by changing the relation between the radii of ball and stator face.

Figure 19:
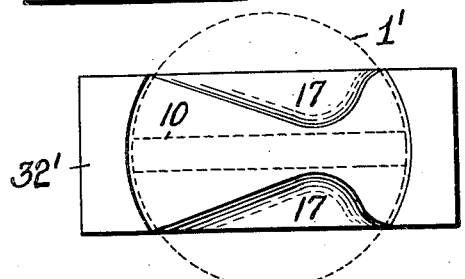

Moreover, this phenomenon enables me to exert torques on the ball around any desired axis and to make these torques proportional to the tilt of the axis of the ball. For example, if I wish to exert a torque around the vertical axis for the purposes of aiding or retarding the damping action, I need only make the point of shortest air gap eccentric to the vertical on one side or the other as shown in the schematic plan view Fig. 19 where the ball 1' is shown in dotted lines as above, 10 is the rotor, 32' the stator and the lines, 17 outline a horizontal projection of the internal face of the stator. Consideration of this figure will show that tilt of the ball will produce a torque on the ball not only around the horizontal axis transverse to the axis of rotation but also around the vertical axis. The magnetic torque around the vertical axis can be employed as a means for damping the oscillations across the meridian and causing the ball's axis to settle on the meridian. It will be evident to those familiar with the art that the energy for damping is in this case derived from the azimuth motor which is held by the thermionic valve follow-up system in a constant azimuthal relation to the axis of the ball.

Figure 20:
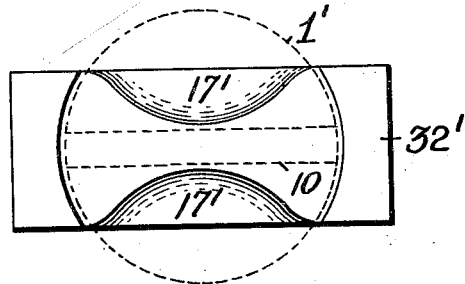
Fig. 20 is a diagram showing still another modification in the shape of the stator.

I have also found that it may have some advantages to employ a combination of the magnetic torque for imparting meridian seeking action with the centralizing effect of the driving torque component to accomplish damping action. The most important advantage resulting from this combination is that it permits me to provide complete freedom between stator and rotor in azimuth while at the same time providing constraint between stator and rotor around the horizontal axis. This may be accomplished by shaping the face 17' of the stator 32" as shown in Fig. 20 which is also a plan view. Complete freedom from magnetic constraint around the vertical axis is desirable because even though a thermionic valve system has been found to follow the axis of the ball with great accuracy, some lag between follow-up and ball must occur, and any such lag will, if magnetic constraint exists around the vertical, produce an effect equivalent to friction on the sensitive element around the vertical axis. By making the stator very wide in comparison with the rotor in azimuth and by shaping the face of the stator so that it is narrow at the top and bottom, I can provide perfect freedom from azimuthal constraint and at the same time provide any desired amount of magnetic constraint around the horizontal axis for meridian seeking purposes.

Where magnetic constraint is employed for delivering torques around horizontal axis only, I rely upon the action of the stator driving torque to accomplish damping and return the axis of the ball to the horizontal. If the stator face is narrowed as indicated in Fig. 20, the portion of the stator face indicated by shading 17' may be cut away in any desired manner so as to produce as gradual or as abrupt change in air gap as desired and thus permit selecting any desired value of magnetic constraint around the horizontal axis.

In case I employ magnetic torques to obtain meridian seeking action, I will not, of course, use the inclined inductances, or Wheatstone bridge follow-up control but will employ a control responsive to azimuthal movements only.

To those familiar with the art, it will be apparent from a consideration of the above that if I employ magnetic torque around the horizontal to establish meridian seeking characteristics, it is the equivalent of making the ball pendulous and that I may, therefore, have an intercardinal rolling error unless some means is employed for stabilizing the compass within its gimbals around one horizontal axis. The quadrantal error produced on an unstabilized pendulous compass is described in numerous text books and catalogs and is so well known as to require no comment. It may not be so apparent to those familiar with the art, however, that the stator drive components will also produce an intercardinal error even though I do not employ magnetic torque, but this is likewise true, as may be easily demonstrated. I, therefore, propose to stabilize the compass.

My preferred means for stabilizing the compass in its gimbals is a very simple gyroscopic apparatus which has many novel features and advantages. This device is indicated in Fig. 22 wherein 19 is a hollow steel sphere in which the cavity 20 is so placed as to give the sphere an axis of maximum inertia, U—D, 2' is the stator of an induction motor for rapidly spinning the sphere around the axis U—D, 3' is a cup in which the sphere rotates, 22' is a pin extending in radial and axial direction from the bottom of the ball to which is secured the inner race of a ball bearing 22, 21 is a slot extending in a north-south direction in the bottom of the cup, in which the outer race of the ball bearing 22 is adapted to roll, 23 is the main compass to be stabilized which is mounted in gimbals not shown, 24 is a bracket for securing the cup and stator to the member to be stabilized. The engagement of the ball bearing with the slot 21 serves two purposes—i. e., (a) it insures rotation of the sphere around the axis U—D when starting, and (b) it transfers gyroscopic stabilizing moments to the compass in the plane perpendicular to the paper. This stabilizer may obviously be used for stabilizing masses other than gyroscopic compasses.

I have found from experience that provided the surfaces of the sphere and cup are accurately made and provided that the weight of the sphere does not exceed a pressure of on the order of five pounds per square inch of projected horizontal area, that the rotation of the sphere will create an air film between sphere and cup sufficiently dense and sufficiently thick to prevent all contact between sphere and cup even when subjected to acceleration pressures exceeding 2g. Apparently this sustaining action of the air is due to adherence of molecules of air to the surface of cup and ball.

The mode of operation of this stabilizing device is as follows: The axis around which stabilizing action is desired is the gimbaled axis N—S which is preferably the north-south axis of the compass. Suppose an acceleration pressure around that axis is produced by the rolling of the ship on which the device is mounted. The pressure will be transferred to the rotating ball through the track 21 and the ball bearing 22. Owing to the rapid rotation of the ball around the axis U—D, the pressure will be strongly resisted and the ball will precess around an axis perpendicular to the plane of the paper, thus causing the ball bearing 22 to travel along the slotted track 21 in the plane of the paper. If the weight and speed of the ball are properly proportioned to the pendulous factor of the compass mass, the precession will be slow and the rolling motion of the ship will reverse long before the ball bearing 22 has reached the end of the track 21. For rolling movements in the plane of the paper, the ball exerts no stabilizing action, the compass is therefore free to swing and the ball bearing 22 simply travels freely toward one end or the other of the track 21. If under any circumstances stabilizing were desired about both horizontal axes, another ball stabilizer could be mounted below the one shown with precessional track at right angles to track 21.

One advantage of this form of stabilizer is its simplicity and freedom from wearing parts. In fact, the only wearing part is the small ball bearing and this part is carrying no load whatever except when exerting a stabilizing moment on the cup. Even then the wear is negligible as the pendulous factor of the compass can be reduced to a very small value so that only a stabilizing touch, so to speak, is required in order to maintain the mass of the compass within 1-degree of the vertical when subjected to acceleration pressures arising from roll or pitch of the ship.

Another important advantage of this method of stabilizing is derived from the automatic centralizing action of the stator. To appreciate this, it is necessary to consider the action of the ordinary form of gyroscopic stabilizer as shown in Fig. 23. We see from this figure that in order to stabilize in the N—S plane, it is necessary to support the gyroscope 71 so that it has precessional freedom around an axis in the plane of the paper. Friction around the stabilized axis, as well as friction around the precessional axis, will inevitably be greater in one direction of rotation about those axes than in the other. The stabilizing gyroscope will therefore become decentralized around its precessional axis and will eventually take up a position where the plane of rotation of the gyroscope is coincident with the plane in which it is desired to stabilize, and the gyroscope will thereby become ineffective as a stabilizer. To prevent this decentralization, it is necessary to provide centralizing springs 25, but to those familiar with the art it will be apparent that the only way in which the centralizing springs can produce centralization is to first displace the stabilized mass around the stabilized axis, thus bringing into play the effect of gravity acting on the stabilized mass and thereby causing the gyroscope to be restored to its central position. If used for stabilizing a gyroscopic compass, this oscillation of the stabilized mass would produce oscillatory errors.

In Fig. 22, however, if the axis of rotation of the stabilizing sphere is caused, by inequalities of friction, to drift away from its normal vertical position, then a component of the driving torque of the stator will act on the sphere in such manner as to cause the axis of rotation of the sphere to precess into the axis of the stator directly and without oscillation. Thus the axis of rotation of the sphere is continually and automatically centralized to the vertical without oscillation.

Another advantage of this form of stabilizer arises from the absence of precessional friction. As is well known to those familiar with the art, the difficulty of theoretical perfection of stabilization depends upon the completeness with which precessional friction can be eliminated. The interval of time during which it can resist the disturbing force depends upon the relation of the gyroscopic moment and the disturbing force. Departures from theoretically perfect resistance to the disturbing force are due to precessional friction and precessional inertia. When considering stabilization against the small and slow acting disturbance now under consideration, precessional friction is the principal obstacle to perfect stabilization. In the form of stabilizer shown in Fig. 22 the only precessional friction is that introduced by the rolling of the ball bearing 22 in the track 21.

Figure 26:
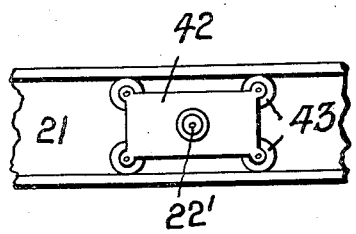
Fig. 26 is an enlarged detail of a modified form of roller carriage for use in connection with the ball stabilizer of Fig. 22.

The ball stabilizer should preferably be so disposed on the phantom or follow-up element of the compass as to always stabilize against swinging movements of the compass in the E—W plane. Stabilization in the E—W plane need only be sufficient to prevent swinging movements of the compass in that plane whereas stabilization in the N—S plane must completely oppose all acceleration pressures in that plane. Fig. 26 is a modified form of the lower bearing for the ball stabilizer as illustrated. According to this form of the invention the pin 22' projecting downwardly from the ball has mounted thereon a carriage 42 having a roller 43 at each corner thereof, said carriage rolling in the trackway 21 as before.

Another means for stabilizing the gimbaled mass of the compass which I may use is shown diagrammatically in Fig. 24. In this form of stabilizer I utilize the equatorial air stream which is thrown off from the meridian seeking ball by reason of its rapid rotation. I have found from experiment and observation that any rapidly rotating sphere picks up articles of air at its poles, forces them by centrifugal action over its surface and throws them off tangentially at its equator. The equatorial air particles immediately adjacent to the surface of the ball are moving at almost the same speed as the peripheral speed of the ball at its equator. Therefore, by placing vanes 30 in this equatorial air stream and by securing these vanes to some part of the gimbaled mass of the compass, I can utilize this rapidly moving air stream to prevent deflections of the gimbaled mass of the compass around the horizontal axis transverse to the axis of rotation of the ball. By suitably deflecting the air currents away from the ball, I can avoid any undesirable effects from the air currents which leave the vanes. So far as I can observe, the insertion of the vanes in the equatorial air stream from the ball does not produce any reaction on the ball. This is logical and may be compared to the fact that a bullet, after being fired from a gun, can be deflected by a steel plate at a distance without causing any reaction on the gun.

All gyro-compasses now available commercially are so designed that they seek what is called the "virtual" meridian—i. e., the meridian which is the resultant of the earth's rotative movement and the ship's movement over the surface of the earth. Provision is then made for correcting the readings of the compass either by selecting corrections from tables or by some automatic correcting means which is manually set for the speed and latitude of the ship and automatically adjusted by the compass itself for the course of the ship. Therefore, in the types of gyroscopic compasses now available, the compass must move from one virtual meridian to another for every change of course, speed or latitude. It is desirable that these transfers from one virtual meridian to another take place in a dead beat manner—i. e., that the ballistic characteristics be such that the compass axis will neither go too far or not far enough. To those familiar with the art, it is well known that a compass of this character cannot be made dead beat unless its ballistic characteristic (pendulous factor) is adjusted to a different value for every latitude. Therefore, the existing compasses have accepted one of two undesirable alternatives—i. e., (1) some complicated arrangement for adjusting the ballistic characteristics in accordance with latitude, or (2) an oscillating error which will arise upon any change of course or speed at latitudes other than the latitude for which the ballistic characteristic has been adjusted.

These compasses also have another disadvantage in that whatever means is used for damping the oscillations of the compass, some displacement of that means is inevitably produced by any change of course or speed. This makes necessary two other undesirable alternatives—i. e., (1) to provide some complicated means for eliminating damping while undergoing changes of course or speed, or (2) to accept the so-called damping error or damping oscillation which results from the restoration of the damping system to normal upon completion of any change of course or speed.

The undesirability of the ballistic and damping errors has been well recognized for some time and efforts have been made to eliminate them without resorting to the complications of ballistic adjustment for latitude and for damping elimination. These efforts have been in the direction of applying corrective factors in such a way as to prevent the compass from ever leaving the true meridian. One method proposed for doing this on the wire suspension type of compass involves means for automatically applying a twist to the suspension wire, making this twist proportional to the desired correction so as to change the settling point to an amount exactly equal to the angular difference between the virtual meridian and the true meridian for the given condition of course, speed and latitude and so keep the axis of the groscopic member on the true meridian. Another method for accomplishing this object, which has been proposed, involves the use of moving weights on the sensitive element. Neither of these schemes has been used because they either are inaccurate or exceedingly complicated. For example, it is obvious that a twist in the suspension would be a very inaccurate method of applying the correction since no way has ever been discovered to obtain exactly the same qualities in any two suspension wires. It will also be evident from a consideration of the existing forms of compasses that to move a weight on the sensitive element would require complicated electrical transmission systems or complicated linkages of some kind in order to get the movement in through the suspension system of the compass to the sensitive element.

Another difficulty in applying this method of correction to existing forms of gyro-compasses is that they would have to be designed with a period of oscillation several times that now prevalently employed (approximately 85 minutes). Otherwise oscillations by reason of ballistic and damping action would occur on changes of course and speed and no advantage would be gained.

One difficulty of giving existing forms of compasses very long periods is that the excessive friction in the supports of their sensitive elements frequently causes them to depart from their settling positions and they must therefore have a comparatively short period in order to eliminate these deviations in a reasonably short space of time.

In the rotating ball compass described in this specification, I have available a very simple means for changing the settling point of the compass with great precision. In fact, I can do this in a manner which is more simple than if I allowed the compass to settle on the virtual meridian and then corrected the compass readings automatically by movement of the lubber line or by the differential introduction of corrections between the follow-up system and the compass card. Moreover, the suspension of my sensitive element is so free from friction that I can safely employ a very long period.

The means which I propose to employ for so coercing the settling point of the compass so as to keep it always on the true meridian is illustrated diagrammatically in Fig. 25. For this purpose I utilize a component of the driving torque of the stator and I obtain this component simply by an azimuthal displacement between the axis of the stator and the axis of the ball. This azimuthal displacement may be introduced by displacement of the ring carrying the follow-up inductance controls but I prefer to apply the displacement directly to the stator 50 which is made movable in azimuth independently of the remainder of the follow-up system 2'. In any case, the corrections will be generated automatically by means well known in the art and applied automatically to the stator. I have found from accurate observation that any displacement of the stator, either in azimuth or in elevation, will always produce a precisely proportional displacement of the axis of the ball, even to an accuracy of a minute of arc.

I may apply these corrections by displacement of the stator axis in elevation since it is obvious to those familiar with the art that such a displacement could readily be used for changing the settling point in azimuth. The preferred means, however, is to correct by displacements in azimuth, in accordance with the speed, course and latitude from a correction device 70 such as is shown in the patent to Sperry #1,279,471, September 17, 1918.

Having provided means for correcting the settling point of the compass so that it will always lie on the true meridian, I so adjust the ballistic characteristics of the compass as to give it a very long period—i. e., twice or four times the period of eighty-five minutes which is usually found in gyro-compasses now commercially available. By the long period and the automatic correction of settling point, I avoid ballistic and damping oscillations and therefore avoid the need of ballistic adjustment or damping elimination, thus greatly simplifying the compass and at the same time making it more accurate.

A consideration of the fundamentals will show why ballistic and damping oscillations are avoided. For example, consider that the ship on which the compass is mounted is stationary at the Equator and that it then suddenly increases its speed to twenty knots due north. The virtual meridian is thereby altered about 1⅓-degree to the west. The compass will endeavor to orient itself to this new virtual meridian. Since it has a very long period, however, it will move very slowly. Before it can move an appreciable amount, the corrector will have been set for twenty knots, and a coercive movement of the stator in azimuth will have been automatically applied in such a way as to produce a change of settling point in the compass of 1⅓-degrees to the east. Under the two equal and opposing forces, the axis of the compass will remain undisturbed.

Another point in favor of the long period compass, incorporating means for precisely coercing the sensitive element to settle on the true meridian under all conditions of course, speed and latitude, arises from the probability of its employment on aircraft of both lighter and heavier than air types. Existing forms of gyrocompasses are seldom employed on aircraft, not only because of their high cost and the great weight of sensitive element necessary to overcome the friction of suspension but also because the rapid and large changes of course, speed and latitude would cause them to oscillate through large angles. The compass I have described in this specification would overcome these difficulties. Because of the great reduction in the friction of suspension, it can be made light in weight. The small number of its parts, the freedom from complexity and the elimination of points necessitating close tolerances in manufacture make possible the production of a compass of low cost. The elimination of ballistic and damping oscillations permit employment of the compass on high speed vehicles such as aircraft.

Figure 21:
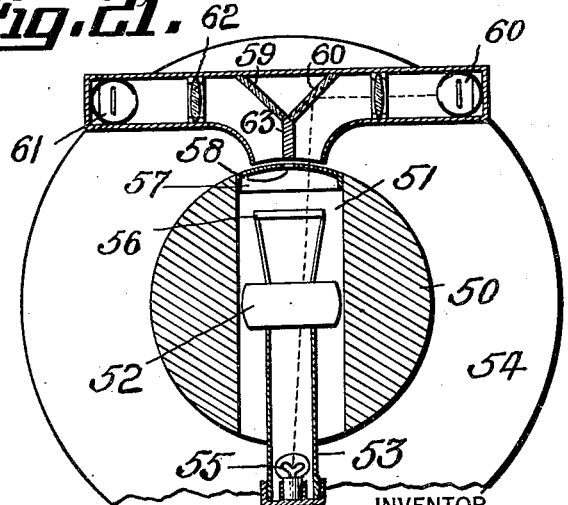
Fig. 21 is a horizontal section through a modified form of ball showing a photoelectric control of the follow-up system.

I may, of course, employ other forms of non-contacting follow-up systems instead of the inductive system, such as shown in Figs. 3 and 4. A system making use of light in combination with photo-electric cells is shown schematically in Fig. 21. In this figure the ball rotor 50 is provided with an axial bore 51. The rotor may be spun by either an exterior winding as in the other figures or by a stator winding 52 placed within the bore and independently supported on the tube 53, which in turn is fixed to the follow-up support 54. A source of light 55 is provided at one end of the tube for illuminating a ground glass screen 56. A closure 57 at the opposite end of the bore is provided with a small opening 58 through which light from the ground glass screen passes. Also fixed to the base 54 is an optical system comprising a pair of mirrors 59—60, one of which is positioned to reflect light striking the same on to photoelectric cell 60, while the other will reflect light on to photo-electric cell 61. Lenses 62 may be provided to concentrate the light on the cells. A partition 63 divides the system into two parts and when the follow-up system is in exact alignment with the axis of the ball, no light or an equal amount of light strikes the photoelectric cells. If any displacement occurs on the other hand one cell receives more light than the other or all of the light and a greater amount of electricity will pass therethrough, thus actuating the follow-up motor after the manner generally indicated in Fig. 4.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A gyroscopic compass comprising a ball-like rotor, means for supporting the same on a self-generated air film, means for pendulously mounting said supporting means, self-aligning rotor spinning means on said support, and means orienting said supporting means to cause it to follow the spinning axis of the rotor in azimuth, whereby meridian seeking properties are imparted to the compass through said spinning means.

2. A gyroscopic compass comprising a ball-like rotor, means for supporting the same on a self-generated air film, means for pendulously mounting said supporting means, self-aligning rotor spinning means on said support, said spinning means being of different width at certain points and means orienting said supporting means to cause it to follow the spinning axis of the rotor in azimuth, whereby meridian seeking and damping properties are imparted to the compass through said spinning means.

3. A gyroscopic compass comprising a ball-like rotor, means for supporting the same on a self-generated air film, rotor spinning means on said support, means orienting said supporting means to cause it to follow the spinning axis of the rotor in azimuth, and means responsive to inclination of said spinning axis with respect to said support and induced by the earth's rotation for controlling said orienting means to displace the supporting means toward the meridian.

4. A gyroscopic compass comprising a ball-like rotor having an equatorial ring of magnetic material, means for supporting the same on a peripheral air film, means for pendulously mounting said supporting means, a stator on said supporting means having narrow poles whereby the ball is spun and a self-aligning couple impressed thereon whereby meridian seeking action is imparted to the compass, and means for orienting said supporting means with the axial position of said rotor.

5. A gyroscopic compass comprising a ball-like rotor having an equatorial ring of magnetic material, means for supporting the same on a peripheral air film, a pendulous support for said supporting means, a stator on said supporting means of varying width from point to point and an air gap whereby the ball is spun and both meridian seeking and damping factors are imparted thereto, and follow-up means for said support responsive to the position of the spinning axis of the ball in azimuth.

6. A gyroscopic compass comprising a ball-like rotor, means for supporting the same on a peripheral air film, rotor spinning means on said support, a pendulous support for said spinning means, means orienting said supporting means to cause it to follow the spinning axis of the rotor in azimuth, means for imparting meridian seeking properties to the compass through said spinning means, and a second ball rotatably mounted on said support for stabilizing said supporting means.

7. A gyroscopic compass for ships comprising a ball-like rotor, means for supporting the same on a peripheral air film, rotor spinning means on said support, means orienting said supporting means to cause it to follow the spinning axis of the rotor in azimuth, means responsive to tilt of the spinning axis of the rotor for displacing said spinning means toward the meridian, and means for also displacing said spinning means with respect to said supporting means in accordance with a function of the speed, course and latitude of the ship to maintain the compass on the true meridian.

8. A gyroscopic compass comprising a ball-like rotor, means for peripherally supporting the same for rotation about a normally horizontal axis and for turning in azimuth, means for pendulously mounting said supporting means, electrical rotor spinning means on said support, and means orienting said supporting means to cause it to follow the spinning axis of the rotor in azimuth, whereby meridian seeking properties are imparted to the compass through said spinning means.

9. A gyroscopic compass comprising a ball-like rotor, means for peripherally supporting the same for spinning and turning in azimuth, rotor spinning means on said support, means orienting said supporting means to cause it to follow the spinning axis of the rotor in azimuth, and means responsive to inclination of said spinning axis for displacing the supporting means toward the meridian.

10. In a ball compass, the combination with the ball, of a cup shaped member for supporting the same on the air film generated by the rotation of the ball, A. C. inductive means for spinning the ball, means for rotating said cup, and a photoelectric light beam system for actuating said means to cause said cup to follow the spinning axis of the ball.

11. A gyroscopic compass comprising a sphere, means for spinning said sphere about a substantially horizontal axis, means for supporting said sphere when spinning on a film of air for freedom for turning in any direction, means for rotating said cup, and a photoelectric light beam system for actuating said means to cause said cup to follow the spinning axis of the ball.

12. In a ball gyroscopic compass, the combination with the ball, of a pendulously mounted supporting shell or cup therefor, in which said ball is supported at its periphery by an air film and electrical means on the shell and ball and lying in a normally vertical plane for spinning said ball and opposing tilt of the spinning axis of said ball with respect to the shell whereby the compass is both damped and caused to seek the meridian.

13. A gyroscopic instrument comprising a ball-like rotor, a cup-shaped member for supporting the same on an air film, means for spinning the ball about an axis, and means for causing said cup to follow said spinning axis including a source of light adapted to project a light beam, a photoelectric cell, and means on said rotor for altering the position of said beam with respect to said cell upon change in the relative position of said ball spinning axis and said cup.

14. A gyroscopic instrument comprising a ball-like rotor, a cup-shaped member for supporting the same on an air film, means for spinning the ball about an axis, and means for causing said cup to follow said spinning axis including a source of light adapted to project a light beam, photoelectric cells, both said light source and cells being mounted on said follow-up support, and light intercepting means along the spinning axis of said rotor for directing said beam to unbalance said photoelectric cells upon change in the relative position of the spinning axis of the ball and said cup.

REGINALD E. GILLMOR.